United States Patent
Fullam et al.

(10) Patent No.: US 8,155,670 B2
(45) Date of Patent: Apr. 10, 2012

(54) CELL NOTIFICATION

(75) Inventors: Scott Fullam, Palo Alto, CA (US); Pasquale Romano, Los Gatos, CA (US)

(73) Assignee: 2Wire, Inc., San Jose, CA (US)

( * ) Notice: Subject to any disclaimer, the term of this patent is extended or adjusted under 35 U.S.C. 154(b) by 558 days.

(21) Appl. No.: 12/264,699

(22) Filed: Nov. 4, 2008

(65) Prior Publication Data

US 2010/0113067 A1    May 6, 2010

(51) Int. Cl.
 *H04W 24/00* (2009.01)
(52) U.S. Cl. .............. 455/456.3; 455/433; 455/422; 455/560; 455/418; 455/419; 455/420; 455/403; 455/414; 455/412; 455/561; 370/332; 370/466
(58) Field of Classification Search .......... 455/456.3, 455/433, 418, 412.1, 422, 560, 561, 412, 455/414, 403, 332, 419; 370/332, 466
See application file for complete search history.

(56) References Cited

U.S. PATENT DOCUMENTS

| | | | |
|---|---|---|---|
| 5,809,414 A | 9/1998 | Coverdale et al. | |
| 5,854,978 A * | 12/1998 | Heidari | 455/418 |
| 5,913,824 A | 6/1999 | Ogasawara et al. | |
| 6,029,045 A | 2/2000 | Picco et al. | |
| 6,879,600 B1 * | 4/2005 | Jones et al. | 370/466 |
| 6,977,921 B1 | 12/2005 | Dolan | |
| 7,072,366 B2 | 7/2006 | Parkkinen et al. | |
| 7,305,302 B2 | 12/2007 | Kaplan | |
| 7,417,968 B2 | 8/2008 | Scribano et al. | |
| 2001/0005676 A1 * | 6/2001 | Masuda et al. | 455/433 |
| 2002/0085631 A1 * | 7/2002 | Engwer | 375/240 |
| 2005/0037738 A1 * | 2/2005 | Nakaya et al. | 455/412.1 |
| 2005/0172154 A1 | 8/2005 | Short et al. | |
| 2006/0246878 A1 | 11/2006 | Khoury | |
| 2007/0243872 A1 | 10/2007 | Gallagher et al. | |

OTHER PUBLICATIONS

PCT International Search Report and Written Opinion of the International Searching Authority, PCT/US2009/062984 filed Nov. 2, 2009, mailed Feb. 26, 2010, 16 pages.
Ubiquisys, Zonegate User Manual, ubiquisys-user-guide_v2e-KM3.indd, Part No. UMooo045-01, Version 1.1, Jan. 2008, 32 pages.

* cited by examiner

*Primary Examiner* — Charles Appiah
*Assistant Examiner* — Michael Vu
(74) *Attorney, Agent, or Firm* — Head, Johnson & Kachigian, P.C.

(57) ABSTRACT

A system and method for enabling an access point to determine that a mobile device has crossed a wireless coverage area boundary associated with the access point and select, for transmission to the mobile device, an audible notification indicating the mobile device has crossed the wireless coverage boundary associated with the access point, wherein the audible notification is stored at the access point in compressed form, prior to determining the mobile device has crossed the wireless coverage area boundary.

15 Claims, 7 Drawing Sheets

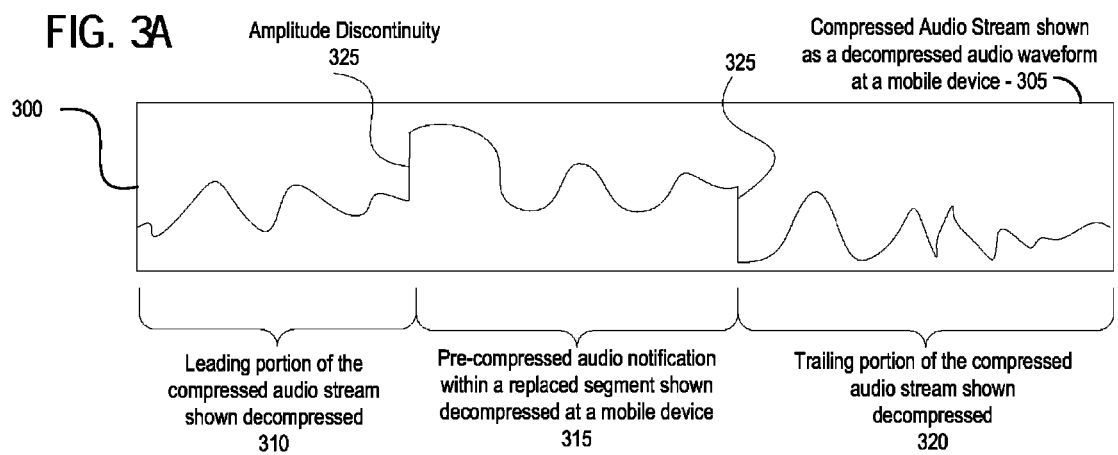
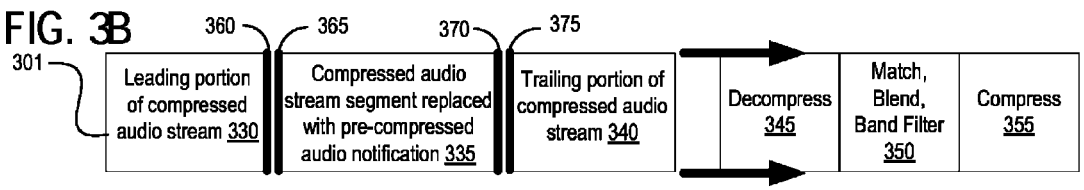
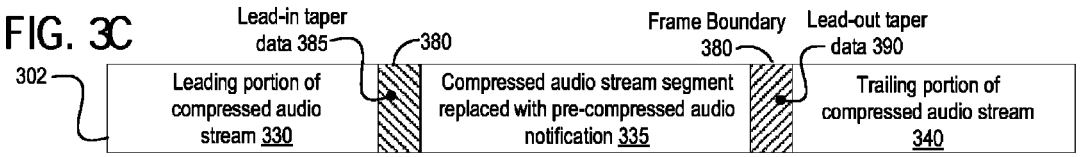

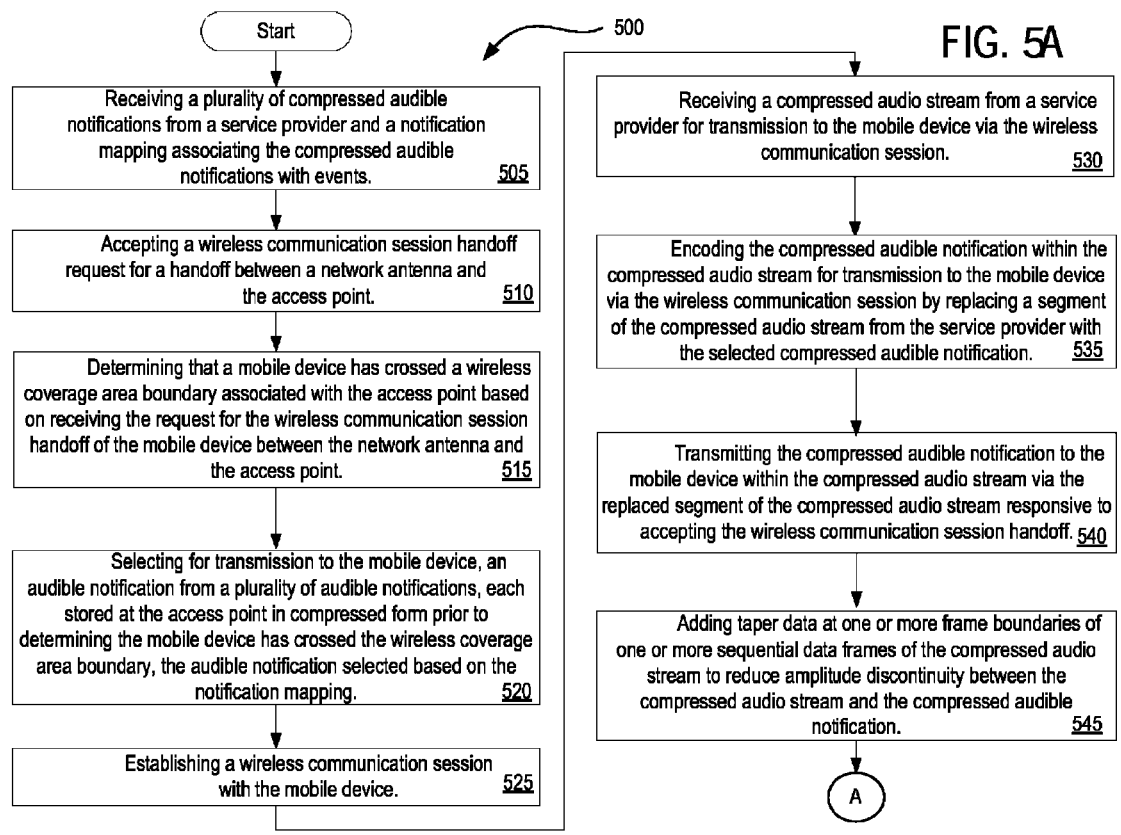

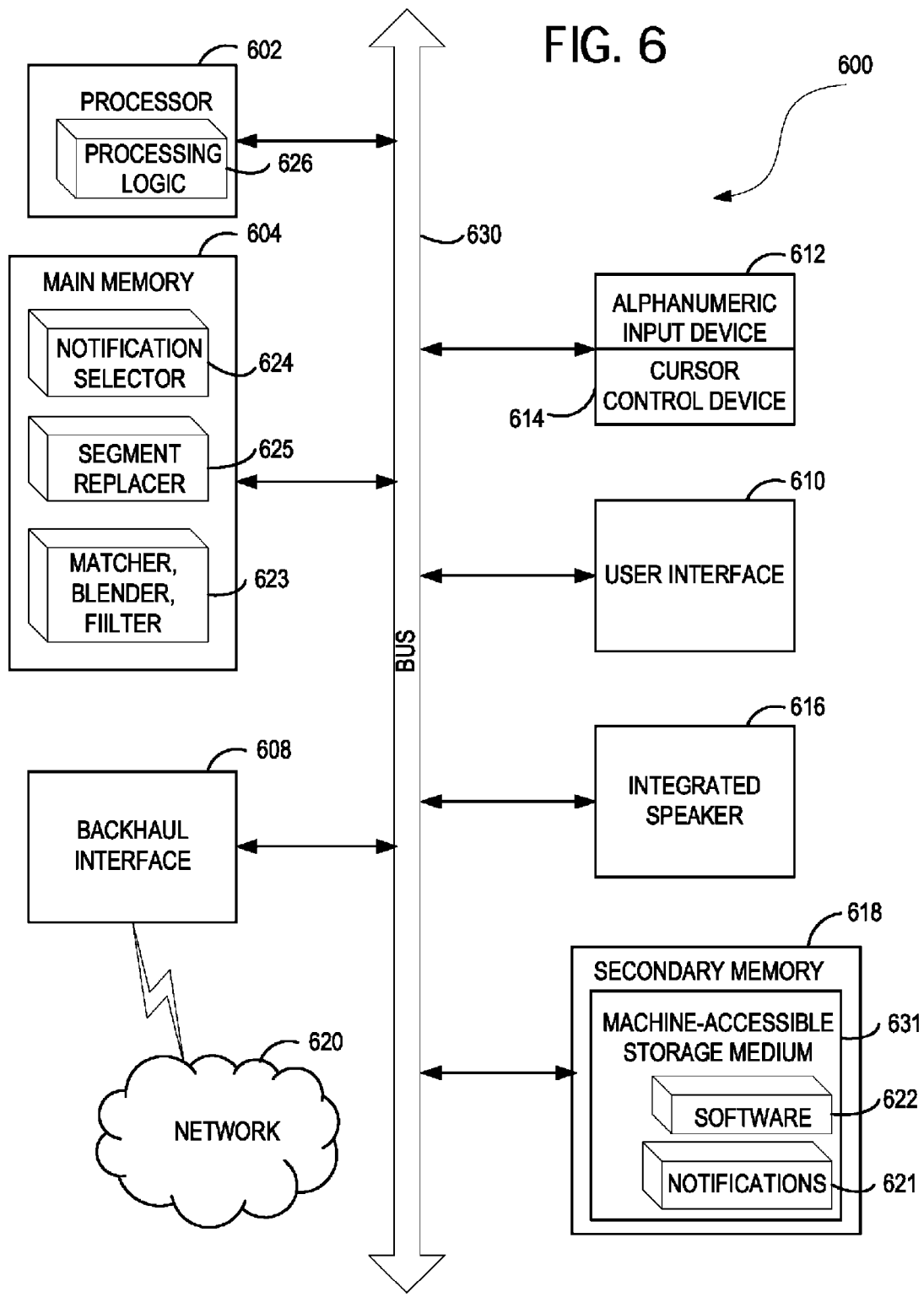

CELL NOTIFICATION

TECHNICAL FIELD

Embodiments of the invention relate to the field of wireless telecommunication networks, and more particularly, to a system and method for notifying a mobile device that it has crossed a wireless signal coverage boundary (e.g., entering or exiting a wireless signal coverage area) associated with an access point.

BACKGROUND

Conventional wireless telecommunication networks, such as cellular and digital wireless telephony networks, create a geographically large coverage area through the use of base stations, antennas (e.g., Node-B and Base Transceiver Station cell towers), Mobile Switching Centers (MSCs), and other equipment common to wireless telecommunication network infrastructure deployments. Conventional network infrastructure provides geographically large coverage areas capable of supporting large numbers of simultaneous communication sessions with mobile devices.

In some situations, it may be desirable for a telephony service provider operating such a network to deploy wireless base stations that are capable of establishing comparatively small network coverage areas. The wireless base stations are less sophisticated and less costly devices that are typically designed to provide wireless telephone network coverage to a few mobile devices (e.g., 4 to 6 simultaneous mobile devices) rather than the large numbers (e.g., 100+ simultaneous mobile devices) provided by a conventional network telecommunications system. The coverage area of the wireless base stations is also designed to be small compared with that of conventional network infrastructure, for example, limited to the size of a home or an office versus a coverage area of several densely populated city blocks, or rural coverage expanding over potentially hundreds of acres. The small coverage areas established by such base stations may be referred to as "femto cells."

Femto cells and their corresponding base stations (often referred to as Femto Cell Base Stations or Home Node-Bs (HNBs)) are commonly deployed by telephony network providers and are designed to operate with the same mobile devices that operate within a larger wireless telecommunications network. For example, a telephony service provider operating a GSM (Global System for Mobile communications) network, will design the base stations to operate with GSM compatible mobile devices. Similar to conventional network base stations, femto cell base stations broadcast a pilot signal that, when encountered by a compatible mobile device, can trigger the mobile device to connect with the femto cell base station, and consequently, disconnect from a nearby base station, in what is referred to as a "handoff."

Handoffs between network base stations (conventional or otherwise) are intentionally designed to be imperceptible to the mobile device being handed off, or to end users of such devices. However, in some wireless telephony applications, it may be desirable for mobile devices to be notified of a successful handoff to another base station, such as a short-range femto cell base station. Notification may be desirable for a variety of reasons, but generally speaking the use of a femto cell benefits end users via improved signal quality, enhanced network services, and potentially reduced fees when operating within a femto cell. Telephony service providers also benefit from use of femto cell technology by way of reduced network load on a corresponding conventional network. Accordingly, notifying end users of femto cell use is beneficial to telephony service providers and end-users alike.

Unfortunately, conventional mechanisms for notifying a mobile device of its entry or exit from a femto cell coverage area are insufficient. Some base stations hardware manufacturers transmit a tone or a beep to mobile devices within the femto cell coverage area by decompressing the audio stream sent to the mobile device, inserting the tone or beep by either mixing it with the audio stream to produce a combination of the notification tone and the audio stream, or blocking out the audio stream and substituting the tone in place of the audio stream, and re-compressing the audio stream for transmission to the mobile device during the time period of the notification tone playback. While such a technique is feasible, it requires costly hardware and processing capabilities to decompress and recompress the compressed audio stream quickly enough to avoid perceptible audio delays or content loss at the mobile device. Sophisticated decompression and compression processing power is a costly addition to an otherwise low-cost device, and when multiplied over thousands of units, the costs may become overly burdensome to a service provider who otherwise desires to deploy femto cell technology. Adding near real time compression and decompression capabilities to a femto cell base station may become so cost prohibitive to a service provider looking to scale-up a deployment program, that the entire technology becomes economically infeasible.

BRIEF DESCRIPTION OF THE DRAWINGS

The present invention is illustrated by way of example, and not by way of limitation, and can be more fully understood with reference to the following detailed description when considered in connection with the figures in which:

FIG. 3A is an exemplary view of a decompressed audio waveform having a portion replaced with an audible notification, in accordance with one embodiment of the present invention;

FIG. 3B is an exemplary view of a compressed audio stream having segment boundaries blended, filtered, or matched, in accordance with one embodiment of the present invention;

FIG. 3C is an exemplary view of a compressed audio stream having taper data added to frame boundaries, in accordance with one embodiment of the present invention;

FIG. 5A is a flow diagram illustrating a method for sending a notification to a mobile device indicating the mobile device has crossed a coverage area boundary associated with an access point, in accordance with one embodiment of the present invention;

FIG. 6 illustrates a diagrammatic representation of a machine in the exemplary form of a computer system, in accordance with one embodiment of the present invention.

DETAILED DESCRIPTION

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

Described herein are a system and method for enabling an access point to determine that a mobile device has crossed a wireless coverage area boundary associated with the access point and select, for transmission to the mobile device, an audible notification indicating the mobile device has crossed the wireless coverage boundary associated with the access point, wherein the audible notification is stored at the access point in compressed form, prior to determining the mobile device has crossed the wireless coverage area boundary.

In one embodiment, compressed audible notifications, such as pre-recorded or synthesized voice messages, are stored at an access point and encoded into a compressed audio stream destined for a mobile device. Compressed notification messages are introduced into the compressed audio stream without requiring a decompression and re-compression cycle of the compressed audio stream as is required by conventional techniques. Because the notification messages are stored in a compressed format (e.g., "pre-compressed" prior to an event requiring their use), they may be encoded into to compressed audio stream by replacing a segment of the compressed audio stream with a corresponding segment containing the compressed notification message.

In some embodiments, amplitude discontinuity reduction is performed to reduce audibly perceptible "pops" that may be introduced when replacing a segment of the compressed audio stream with an audible notification message in compressed form, rather than summing in the notification message as an analog waveform into a decompressed portion of the audio stream. Amplitude discontinuity reduction may include, for example, adding taper data to frame boundaries adjacent to the compressed audible notification, as well as other methods described in more detail below.

Providing notification capabilities to mobile devices without requiring that a base station support near real-time compression and decompression capabilities dramatically reduces the complexity and required computing capabilities of the base station, and thus, reduces the overall cost to deploy such technology.

Figure 1:
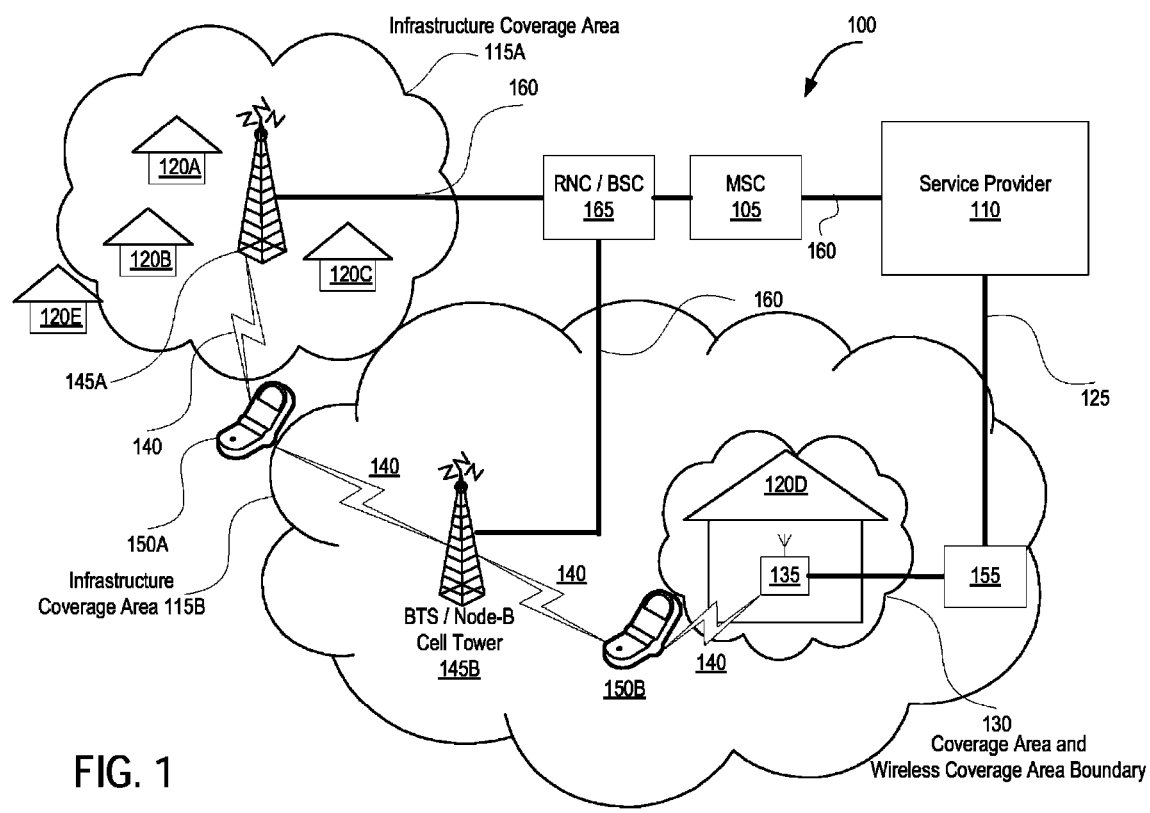
FIG. 1 illustrates an exemplary network architecture in which embodiments of the present invention may operate.

FIG. 1 illustrates an exemplary network architecture 100 in which embodiments of the present invention may operate. The network architecture 100 may include Service Provider (SP) 110 which is communicably interfaced with Mobile Switching Center (MSC) 105 via SP backhaul 160. MSC 105 is further connected with base station 145 via SP backhaul 160.

SP 110 may be a telecommunications company that provides wireless voice services, wireless data services, or both. SP 110 may operate a wireless communications network infrastructure that communicates over a licensed band of wireless spectrum and operates in accordance with well known wireless communication protocols. Such protocols may include, for example, a Universal Mobile Telecommunications System (UMTS) compatible protocol, a Global System for Mobile communications (GSM) compatible protocol, a Code Division Multiple Access (CDMA) compatible protocol, a Worldwide Interoperability for Microwave Access (WiMAX) compatible protocol, and so forth.

SP 110 communicates with MSC 105 via SP backhaul 160, which is a high-speed data connection owned or leased by SP 110. For example, SP backhaul 160 may be a digital signal 1 (DS1 or T1) communications interface providing network connectivity between SP 110 and MSC 105. Importantly, SP backhaul 160 is financially supported by SP 110 as an overhead component of operating network 100.

MSC 105 provides interoperability between an SP's 110 wireless telephony network and traditional land-line networks, as well as other wireless telephony networks not operated by SP 110. MSC 105 further provides connectivity between multiple mobile devices operating within SP's 110 network. MSC 105 performs other conventional MSC responsibilities including setting up and releasing end-to-end connections between telephony devices, handling usage tracking for billing purposes, and coordinating handoffs between network infrastructure cell towers.

Each MSC 105 typically manages multiple Radio Network Controllers (RNCs) or Base Station Controllers (BSCs) 165 depending on whether the network infrastructure corresponds with second generation (2G) or third generation (3G) mobile telecommunication standards. Each RNC/BSC 165 in turn manages multiple cellular towers, such as Base Transceiver Station (BTS) or "Node-B" cell tower 145A and 145B, again depending on whether the network infrastructure corresponds with 2G or 3G mobile telecommunication standards. Each cell tower 145 is responsible for handling the functions related to wireless radio communications with mobile devices operating within an infrastructure coverage area 115 provided by the cell tower 145. Such functions include paging of mobile devices, allocating radio channels, radio signal quality management, and coordinating voice and data communications between mobile devices in the cell tower's 145 infrastructure coverage area 115. In some telecommunication networks, functions of MSC 105, RNC/BSC 165, and BTS/Node-B cell towers 145 may be broken down into additional physical or logical components, however, the basic overall wireless network infrastructure (e.g., 2G and 3G wireless communication standards which correspond to, for example, Global System for Mobile communications (GSM) and Universal Mobile Telecommunication System (UMTS) respectively) is well known in the art.

Each cell tower 145 provides a corresponding infrastructure coverage area 115. Telecommunication network operators (e.g., SP 110) carefully deploy BTS/Node-B cell towers in a systematic manner to provide as geographically large of a coverage area as possible, while minimizing overlap, and minimizing the overall number of cell towers required. Another consideration is the amount of bandwidth required in a particular area. For example, a densely populated city center will require more bandwidth for the same geographically sized area than a sparsely populated rural area.

Infrastructure coverage area 115A is provided by BTS/Node-B cell tower 145A and geographically encompasses buildings 120A, 120B, and 120C. Buildings 120 generally represent an end users' residence, office, shopping center, or other places and locations from which an end user may access wireless telecommunication services. Obviously, a user need not be inside a building to utilize a mobile device on SP's 110 network. Building 120E is shown only marginally within infrastructure coverage area 115A, and thus, will suffer from very poor network connectivity, or have no access to SP's 110 network as infrastructure coverage area 115 is insufficient to communicate with mobile devices operating from the location of building 120E.

Building 120D is shown within infrastructure coverage area 115B provided by BTS/Node-B cell tower 145B, however, building 120D is encompassed by access point coverage area 130 provided by access point 135 (e.g., within wireless coverage area boundary 130 associated with access point 135). Access point coverage area 130 provides access to SP's 110 network via access point 135 rather than through conventional network infrastructure, such as BTS/Node-B cell tower 145B. Access point coverage area 130 is shown providing such access in a location that is within a coverage area (e.g., 115B) provided by conventional network infrastructure, however, access point 135 could similarly be deployed at building 120E, thus providing access point coverage 130 for the building's 120E location which lacks sufficient access to SP's 110 network by conventional means.

Access point 135 is shown communicably interfaced with SP 110 via private backhaul 125, through private internet carrier 155. Rather than utilizing a data interface paid for and operated by SP 110, as is done by conventional BTS/Node-B cell towers 145A and 145B, access point 135 communicates with service provider 110 via a regular internet connection (e.g., private backhaul 125), such as a Digital Subscriber Line (DSL), Fiber Optic connection (e.g., such as those offered by Verizon FiOS™), or a cable internet connection (e.g., such as those offered by Comcast™) provided by a private internet carrier 155. Internet connections such as these are commonplace in most residences, businesses, and commercial properties, and are adequate for transmitting compressed audio streams between access point 135 and service provider 110. In some embodiments, Quality of Service (QoS) parameters may be employed to guarantee a minimum acceptable level of performance on private backhaul 125 by marking and giving priority to packets associated with access point 135.

An access point as referred to herein may be, for example, a "pico cell" base station or a "femto cell" base station. A pico cell base station provides a short-range wireless coverage area via an antenna operating with limited power and communicates with a remote Base Station Controller (BSC) typically connected via twisted pair ISDN connection or Ethernet. Such a BSC typically manages multiple pico cells, and routes wireless communication traffic from the pico cell onto a backhaul internet connection for transmission to a centralized service provider. A femto cell base station likewise provides a short-range wireless coverage area via an antenna operating under limited power, however, a femto cell may also contains basic BSC functionality to route wireless communication traffic to a centralized service provider, and possibly basic Mobile Switching Center (MSC) functionality enabling the femto cell base station to coordinate mobile telephony traffic, including functionality to establish end to end connections, handle handoffs between network cell towers, and appropriately route telephony voice communications (e.g., transmit switched packets to a connected mobile device). Alternatively, an access point may be another type of base station.

Mobile devices 150A and 150B communicate wirelessly with cell towers 145A and 145B via air interface 140. Similarly, mobile device 150B communicates with access point 135 via air interface 140. Air interface 140 represents the wireless communication signals, protocols, and interface between the cell tower 145 and mobile devices 150 and between access point 135 and mobile devices 150.

Mobile device 150A is shown near the outside perimeter of both infrastructure coverage area 115A and infrastructure coverage area 115B, and is depicted to be in communication with both BTS/Node-B cell towers 145A and 145B. As mobile device 150A moves away from BTS/Node-B cell towers 145A and 145B, it eventually exceeds the optimal infrastructure coverage area 115 of cell tower 145A and comes within range of infrastructure coverage area 115 associated with cell tower 145B. When this occurs, the network 100 initiates a handoff of a wireless communication session associated with mobile device 150A from cell tower 145A to cell tower 145B. The handoff is seamless from the perspective of mobile device 150A, however, once the handoff is complete, mobile device 150A communicates with cell tower 145B to access network 100 services rather than cell tower 145A. Mobile device 150A could however, again relocate into the infrastructure coverage area 115A associated with cell tower 145A, and another handoff would occur, this time, back to cell tower 145A.

Similarly, mobile device 150B is shown completely within the infrastructure coverage area 115B of cell tower 145B, however, is near the wireless coverage area boundary 130 associated with access point 135. As mobile device 150B nears wireless coverage area boundary 130 associated with access point 135, the network 100 will coordinate a handoff from cell tower 145B to access point 135. Similarly, as mobile device 150B moves away from access point 135 and away from the wireless coverage area boundary 130, the network will coordinate a handoff back to cell tower 145B.

Mobile device 150 may be a conventional cell phone compatible with one or more wireless communication protocols (e.g., UMTS, GSM, CDMA, etc.), or may be a wireless handheld device, such as a Personal Digital Assistant (PDA), a smart phone, a laptop computer or PC enabled to communicate with wireless networks (e.g., through a wireless network access card), or other electronic device capable of sending and receiving data or voice information via wireless communication networks.

Access point coverage area 130 provided by access point 135 is geographically small compared with that of infrastructure coverage areas 115 associated with conventional cell towers (e.g., BTS/Node-B cell towers 145A and 145B). For example, access point coverage area may be limited to a house, office building, shopping mall, apartment building etc. Through the use of multiple access point antennas, access point coverage area 130 and its corresponding boundary may be expanded to larger areas such as a university or corporate campus, however, such implementations are still geographically small in comparison to a conventional infrastructure coverage area 115 which may cover several city blocks or hundreds of acres in rural areas.

Figure 2:
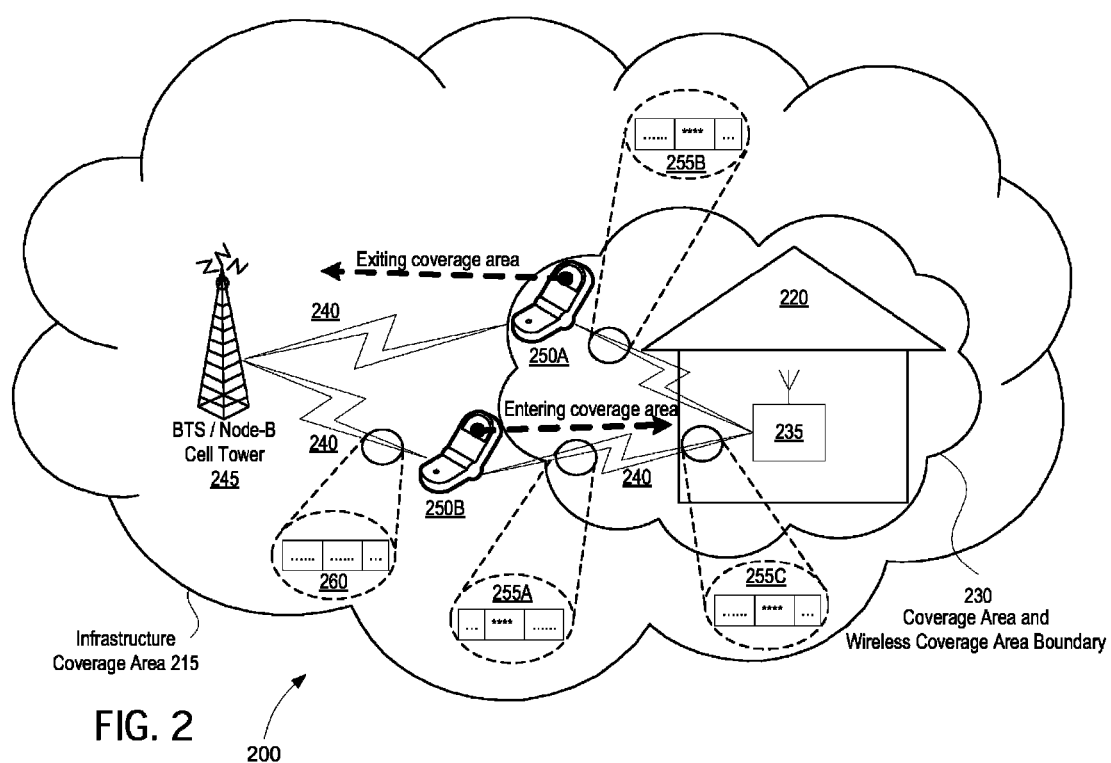
FIG. 2 is an alternative view of an exemplary network architecture in which embodiments of the present invention may operate.

FIG. 2 is an alternative view of an exemplary network architecture 200 in which embodiments of the present invention may operate. BTS/Node-B cell tower 245 provides infrastructure coverage area 215 which completely encompasses building 220 and access point coverage area 230 surrounding building 220. Access point coverage area 230 and its corresponding wireless coverage area boundary 230 is provided by access point 235 located interior to building 220. Mobile devices 250A and 250B communicate with cell tower 245 and access point 235 via air interface 240. Mobile device 250A is depicted as exiting access point coverage area 230 and crossing wireless coverage area boundary 230 into infrastructure coverage area 215, while mobile device 250B is depicted as crossing wireless coverage area boundary 230, and entering access point coverage area 230 from infrastructure coverage area 215.

As mobile devices 250A and 250B enter and exit access point coverage area 230 associated with access point 235

(e.g., cross wireless coverage area boundary 230 in either direction), various notifications (255A, 255B, and 255C) are transmitted to mobile devices 250A and 250B.

In one embodiment, mobile device 250B wirelessly communicates with cell tower 245 via air interface 240. Mobile device 250B has an ongoing wireless communication session with cell tower 245, over which mobile device 250B can exchange wireless communication data 260, such as a compressed audio stream or digital information (e.g., application data, website data, application prompts, etc.) with cell tower 245. In one embodiment, a compressed audio stream originates from a second telephony device, such as another mobile device or a landline telephone. In other embodiments, wireless communication session may carry digital information that originates from a website responsive to a request from mobile device 250B, or carry application data destined for a mobile application operating on the mobile device.

When mobile device 250B transitions into access point coverage area 230, wireless communication session 260 will be handed off to access point 230, and access point 230 will then transmit wireless communication data 260 (e.g., compressed audio streams or digital information) to mobile device 250B via a new wireless communication session between the mobile device and access point 235.

Access point 235 may encode a notification (255A, 255B, or 255C) into wireless communication data destined for mobile devices 250A or 250B. For example, FIG. 2 depicts access point 235 transmitting wireless communication data to mobile devices 250A and 250B with notifications encoded into the original compressed audio stream or digital information.

In one embodiment, access point 235 encodes a notification (e.g., 255A or 255B) into a compressed audio stream for transmission to a mobile device (e.g., 250A or 250B) upon determining that the mobile device (e.g., 250A or 250B) has crossed wireless coverage area boundary 230, entering or exiting the access point coverage area 230. For example, access point 235 may replace a segment or portion of the compressed audio stream with a compressed audible notification stored at the access point and transmit the notification (e.g., 255A or 255B) to the mobile device (e.g., 250A or 250B) within the compressed audio stream via the wireless communication session.

In one embodiment, access point 235 encodes notification 255B into a compressed audio stream for transmission to mobile device 250A upon determining that mobile device 250A is exiting the access point coverage area 230. In one embodiment, access point 235 encodes notification 255A into a compressed audio stream for transmission to mobile device 250B upon determining that mobile device 250B is entering the access point coverage area 230.

In one embodiment, access point 235 encodes application interface notification 255C into a digital information destined for mobile device 250A or 250B upon determining that mobile device 250A or 250B is crossing wireless coverage area boundary 230, entering or exiting the access point coverage area, or upon some other event. For example, access point 235 may alter application data destined for an application executing at the mobile device, causing the application to display, for example, an application prompt, a text message, or transmit an audible tone. Similarly, access point 235 may modify HyperText Markup Language (HTML) data destined for a web browser operating at mobile device 250 causing the web browser to redirect to a webpage controlled by, or stored at the access point. Access point 235 may similarly send a JAVA™ compatible application prompt directed at a JAVA™ virtual machine compatible servlet application or a similar Object Oriented Programming (OOP) based servlet executing at the mobile device with instructions for the servlet to display the prompt at the mobile device.

Audible notifications 255A and 255B may include tones or beeps indicating that mobile device 250 has entered or exited access point coverage area 230 or crossed its corresponding boundary. In some embodiments, audible notifications 255A and 255B may include pre-recorded or synthesized (e.g., computer generated) speech. Audible notifications 255A and 255B may further include arbitrary waveforms stored in either compressed or uncompressed format, where the waveform is a stored representation of recorded tones, music, speech, or other sounds captured by a suitable waveform capture or audio recording device. For example, audible notification 255A may include a pre-recorded voice message stating, "You have now entered a femto cell . . . additional services or features are available." Similarly, audible notification 255B may include a pre-recorded or synthesized voice message stating, "You are now leaving the femto cell coverage area . . . femto cell coverage area rates and services are no longer available."

Based on the notifications received, an end-user or a mobile device (e.g., 250) may be able to determine the geographic location of the wireless coverage area boundary 230. An end-user may desire to know the scope or extent of a coverage area associated with an access point to make informed decisions regarding billing rates, service quality, and so forth.

In one embodiment, audible notification messages 255A and 255B are stored at the access point in already compressed form, and are encoded into compressed audio streams without decompressing or recompressing either the audible notification messages or any portion of the compressed audio stream. For example, the compressed audible notifications are available (e.g., stored) at the access point 235 in a pre-compressed form, prior to detecting an event requiring their use (e.g., determining that a mobile device has crossed a boundary 230 associated with the access point 235), prior to establishing a wireless communication session with a particular mobile device 250, and prior to transmitting a compressed audio stream from a service provider to such a mobile device 250. The compressed audible notifications may be received from another source, such as a service provider in compressed form, or received in wave form, and compressed at the access point prior to their required use (e.g., using low cost, but non-real-time compression capabilities, or more sophisticated real-time compression capabilities when available).

In one embodiment, application interface notification 255C includes text corresponding with an audible notification message, and is transmitted to mobile device 250 as a redundant message in alternate form (e.g., in textual form rather than audible form). In one embodiment, application interface notification 255C provides supplemental information associated with an audible notification message (e.g., 255A and 255B), such as textual information indicating what additional services are available within the access point coverage area 230.

Additional services available within the access point coverage area may include, for example, alternate billing rates for voice telephony communications (e.g., lower per minute usage fees, or "free minutes" accrual rather than a reduction of "anytime" minutes), alternate billing rates for data communications (e.g., lower per megabyte usage fees, or no usage fee for data access within a femto cell or within a access point coverage area), improved bit-rates for voice telephony communications (e.g., use of less aggressive compression and improved sampling rates, or both, resulting in improved voice quality), and improved transfer speeds for data communications (e.g., improved maximum download speeds compared to maximum allowable download speeds available when operating within conventional infrastructure coverage area 215).

Additional services available within the access point coverage area may further include local file sharing, location notification, e-commerce, and Private Branch eXchange (PBX) services. For example, local file sharing services include functionality to share media and other electronic data and files between the mobile device and other electronic devices communicatively interfaced with the access point 135. Such electronic devices may include other mobile devices connected with the access point, personal computers operating within a home network and communicatively interfaced (e.g., networked over a Local Area Network), portable devices, video game systems, and so forth. Electronic data and files may include documents, music files, audio/visual files, executable binary files, photos, and so forth, whether stored on PCs or other mobile devices associated with the access point.

Location notification services may be available to indicate whether other mobile devices associated with the access point 135 are communicatively interfaced with the access point at a given time, or provide an approximate location for such devices if not currently connected with the access point. For example, upon connecting with the access point, a user may elect to have a mobile device be notified that, for example, a child's or spouse's mobile device is currently within range or out of range from the access point coverage area 230 (and by extension, whether or not the child or spouse is home). The access point may access additional location information, such as an approximate geographic location associated with a specified mobile phone through the service provider 110 (e.g., a geographic location based on cell tower associations or Global Positioning Information solicited from a compatible mobile device).

E-commerce services may be available which enable the mobile device to access media and services directly from the mobile device. For example, within the access point coverage area 230, the mobile device may be enabled to download ringtones, music files, audio/visual files, games, pictures, and so forth. Such content may not be available outside of the access point coverage area or require payment of a higher fee.

Local Private Branch eXchange (PBX) services between the mobile device and other telephony devices communicatively interfaced with the access point may likewise be available. Such capabilities enable the mobile device to interface with other mobile devices within the access point coverage area 230, and further with land-line based telephones or other telephony devices communicatively interfaced with the access point (e.g., through a home network router or LAN). PBX services are known in the art and include functionality such as call transferring, conference calls, call forwarding, call waiting, voice mail, call hold, and so forth.

In one embodiment, audible notifications 255A and 255B describe additional services and benefits available within access point coverage area 230 when entering (e.g., "you will not be charged for minutes used while operating within the access point coverage area") or the loss of such services and benefits when exiting (e.g., "you will now be charged your default billing rate for minutes used outside of the access point coverage area"). Audible notifications describing benefits and services may be user configurable. For example, an end user may configure the access point to provide audible notifications detailing additional services by default, or configure the access point to announce the additional services responsive to a number sequence pressed during a phone call (e.g., by pressing, for example, "# #" during a phone call) or responsive to, for example, a text message or a message from an application executing at the mobile device.

In one embodiment, audible notifications are transmitted back to a service provider for transmission to a second telephony device connected end-to-end with mobile device 250. For example, access point may replace a segment or portion of an outgoing compressed audio stream originating at mobile device 250 and destined for a second connected mobile device or landline handset, with the same audible notification as is transmitted to mobile device 250. In this example, both mobile devices connected via an end-to-end telephony communication session (e.g., a phone call) would receive the same audible notification. In some embodiments, access point 235 may transmit a different audible notification (e.g., 255A) to a second telephony device than the audible message transmitted to mobile device 250.

In one embodiment, access point 235 may select one or more audible notifications (e.g., 255A and 255B) to encode into the compressed audio stream for transmission to mobile device 250. The audible notifications may pre-loaded into access point 235, or may be managed remotely, for example, by a remote service provider, such as SP 110 of FIG. 1 (e.g., the service provider may cause the access point to automatically download and store updated audible notifications in compressed form, and use the updated audible notifications as directed by the service provider).

The audible notifications stored at an access point may also include multiple versions of the a message, for example, multiple versions to accommodate different compression protocols required by different mobile devices or wireless protocols, multiple versions of a similar message to accommodate different spoken languages, and so forth. Likewise, multiple compressed audible notifications may be used to indicate different events, services, and rates (e.g., different variations of beeps and tones, or different voice messages describing corresponding events, services, and rates).

In one embodiment, the remote service provider provides an event to audible notification map that associates particular events determinable at access point 235 to particular audible notifications. For example, events may include, determining a mobile device has entered or exited a coverage area or crossed a boundary associated with access point 235, determining a visiting mobile device has entered or exited a coverage area, determining a registered mobile device has entered or exited a coverage area, determining an unauthorized device has entered or exited a coverage area, determining an unauthorized device has entered a coverage area and accessed an emergency services number (e.g., dialing "9-1-1") via access point 235, determining a smart phone capable of running OOP based applications has entered or exited a coverage area, determining a mobile device incapable of running OOP based programs has entered a coverage area.

In one embodiment, selecting one or more audible notifications may be based on other logical conditions in conjunction with the notification map. For example, the access point may utilize data, information, or conditions determinable at the access point. For example, the internal time of the access point may compared against a time based schedule, the identity of a mobile device may be compared against a member list within the access point to determine if the mobile device is a known "member" or an unknown "guest" in relation to the access point. The access point may choose different audible notifications based on the current population of other mobile devices associated with the access point, for example, the access point may notify an incoming mobile device that other family members are currently "home," or that all the children are home or not home, based on the population of mobile devices currently operating within range of the access point. Other data points that may be used include environmental attributes, such as internal temperature, external temperature, humidity, and local weather report data (e.g., tides, moon, precipitation, cloud cover, wind speed/direction, and so forth). Network condition information may also be used in the selection of audible notifications, including information regarding network link failures, low bandwidth status, network status report data, and excessive link delay status. Such conditions may degrade telephony services, and thus, a corresponding audible notification may indicate that voice quality will be poor, that connectivity outside of the access point coverage area is unavailable, or that perceptible audible delays may be present.

In one embodiment, access point 235 selects an audible notification (e.g., 255A or 255B) based on an event to audible notification map provided by a service provider. In one embodiment, access point 235 selects an audible notification based on an end user configurable parameter stored at the access point.

FIG. 3A is an exemplary view of a decompressed audio waveform 300 having a portion replaced with an audible notification, in accordance with one embodiment of the present invention. The decompressed audio waveform provides an illustrative view of a compressed audio stream after having been decompressed at a mobile device (element 305).

The decompressed audio wave has three segments. Leading portion 310 of the compressed audio stream is shown decompressed. This leading portion may be a segment or portion of, for example, a voice telephone call that precedes a replaced portion of the compressed audio stream containing the audible notification. Similarly, trailing portion 320 of the compressed audio stream is shown decompressed. This trailing portion may be a segment or portion of, for example, the same voice telephone call that follows a replaced portion of the compressed audio stream containing the audible notification. Stated differently, leading portion 310 and trailing portion 320 are original portions of the compressed audio stream (shown in decompressed form) as received at an access point, having originated at a second end point telephonically interfaced with the mobile device end point.

However, middle portion 315 is not an original portion of the compressed audio stream as received at the access point. Rather, middle portion 315 illustrates the segment or portion of the compressed audio stream replaced with a compressed audible notification at the access point (shown in decompressed form).

As discussed above, an access point may replace a segment or portion of a compressed audio stream with a compressed audible notification. When a mobile device receives the compressed audio stream, it will decompress and audibly transmit (e.g., "play" the audio via an integrated speaker) the compressed audio stream, including the segment replaced with the compressed audible notification. However, replacing portions of a compressed audio stream in such a way may lead to amplitude discontinuities 325 due to a waveform mismatch (e.g., a sharp or sudden increase or decrease in amplitude) at a frame boundary between an original segment of the compressed audio stream and a replaced segment of the compressed audio stream.

For example, amplitude discontinuity 325 at the frame boundary between segment 310 and 315 depicts a sharp increase in amplitude rather than a smooth wave pattern increase. Such a amplitude discontinuity 325 when audibly transmitted through a speaker may cause a popping or clicking sound, depending on the severity of the amplitude discontinuity 325. Various methods for decreasing clicks and pops caused by amplitude discontinuity 325 between original and replaced portions of a decompressed audio stream are discussed below.

FIG. 3B is an exemplary view of a compressed audio stream 301 having segment boundaries blended, filtered, or matched, in accordance with one embodiment of the present invention. Compressed audio stream 301 includes a leading portion 330, a middle portion 335 which contains a segment of the compressed audio stream replaced with an audible message at an access point, and a trailing portion 340 of the compressed audio stream. Compressed audio stream 301 further includes frame boundary 360 at a trailing edge of leading portion 330, frame boundary 365 at a leading edge of middle portion 335, frame boundary 370 at a trailing edge of middle portion 335, and frame boundary 375 at a leading edge of trailing portion 340.

Frame boundaries 360 and 365 are adjacent, and when decompressed, would potentially contain an amplitude discontinuity (e.g., 325) as shown between portions 310 and 315 of FIG. 3A above. Similarly, frame boundaries 370 and 375 are adjacent, and when decompressed, would potentially contain an amplitude discontinuity (e.g., 325) as shown between portions 315 and 320 of FIG. 3A above.

In some embodiments, compressed audio stream 301 contains a voice stream compressed in accordance with Adaptive Multi-Rate compression (AMR) on a Universal Mobile Telecommunications System (UMTS) operated by a service provider. In an alternative embodiment, compressed audio stream 301 contains a voice stream compressed in accordance with Linear Predictive Coding (LPC) on a Global System for Mobile communications (GSM) operated by a service provider The access point may perform amplitude discontinuity blending, matching, or band filtering on the portion of the compressed audio stream known to potentially contain amplitude discontinuities 325. For example, the access point may decompress (block 345) short targeted slices (e.g., sub-portions) of a compressed audio stream, and match, blend, or band filter (block 350) the decompressed audio waveform (or perform some combination), and re-compress (block 355) the decompressed short targeted slices.

Decompressing and recompressing very small portions, such as slices of portions located at frame boundaries, consumes far less time and computing resources than decompressing and recompressing entire portions of a compressed audio stream, and thus, allows an access point to be manufactured for lower cost than a system having full near-real time compression and decompression capabilities.

In one embodiment, the access point decompresses trailing frame boundary 360 of leading portion 330 and leading frame boundary 365 of middle portion 335 containing the audible notification, performs amplitude matching, blending, and/or band limit filtering to reduce amplitude discontinuity 325 between the decompressed frame boundaries 360 and 365, and recompresses the decompressed frame boundaries. The access point may perform similar functions on adjacent frame boundaries 370 and 375 to reduce amplitude discontinuity 325 between the two frame boundaries when in decompressed form.

As shown, compressed audio stream may contain multiple sequential data frames, which may, in some embodiments, correspond with data packets on a switched packet network. In some embodiments, segment 335 replaced with a compressed audible notification may be made up of one or more sequential data frames which constitute a subset of sequential data frames making up the compressed audio stream.

FIG. 3C is an exemplary view of a compressed audio stream 302 having taper data added to frame boundaries, in accordance with one embodiment of the present invention. Compressed audio stream 302 is shown with leading portion 330 of the compressed audio stream preceding the compressed audio stream segment replaced with a compressed audio notification (portion 335), which precedes trailing portion 340 of the compressed audio stream. A first frame boundary 380 separates portions 330 and 335 and a second frame boundary 380 separates portion 335 from portion 340.

An alternative mechanism for reducing amplitude discontinuity 325 between portions of a compressed audio stream adjacent to a segment of the compressed audio stream replaced with a compressed audible notification is to add taper data leading into and out of the segment replaced with the compressed audible notification (e.g., segment 335). Taper data may be added without decompressing or recompressing any portion of the compressed audio stream, and thus, requires very little computing resources compared to a system having compression and decompression capabilities.

For example, in one embodiment, lead-in taper data 385 is added to either the trailing edge of leading portion 330 preceding replaced portion 335, to the leading edge of replaced portion 335 following leading portion 330, or both. Similarly, lead-out taper data 390 is added to a trailing edge of replaced portion 335, to a leading edge of trailing portion 340, or to both. In such an embodiment, lead-in and lead-out taper data (e.g., 385 and 390 respectively) reduce the overall amplitude discontinuity 325 and thus, reduce perceptible clicking and popping, without requiring compression or decompression capabilities. An audio taper function implementing the injection of lead-in and lead-out taper data (e.g., 385 and 390) within a pre-compressed audio waveform, such as the compressed audio stream, operates by scaling up or down, on a block by block basis, all frequency coefficients, or an equivalent representation of the frequency coefficients within in a compressed audio waveform segment or file, in equal proportions.

In some embodiments, lead-in taper data 385 and lead-out taper data 390 is included as part of a compressed audible notification. For example, taper data (e.g., 385 and 390) may be added to a pre-recorded voice message in analog form, compressed in accordance with appropriate wireless protocols (e.g., AMR compression for UMTS systems), and then the compressed audible notification, including the incorporated taper data, may be pre-loaded onto an access point or download to an access point at a later time. Similarly, taper data (e.g., 385 and 390) may be added to an already compressed audible notification, and stored for later use, negating the need to apply taper data to the frame boundaries when the audible notification is embedded or encoded into the compressed audio stream. A combination of the above techniques may also be used.

Figure 4A:
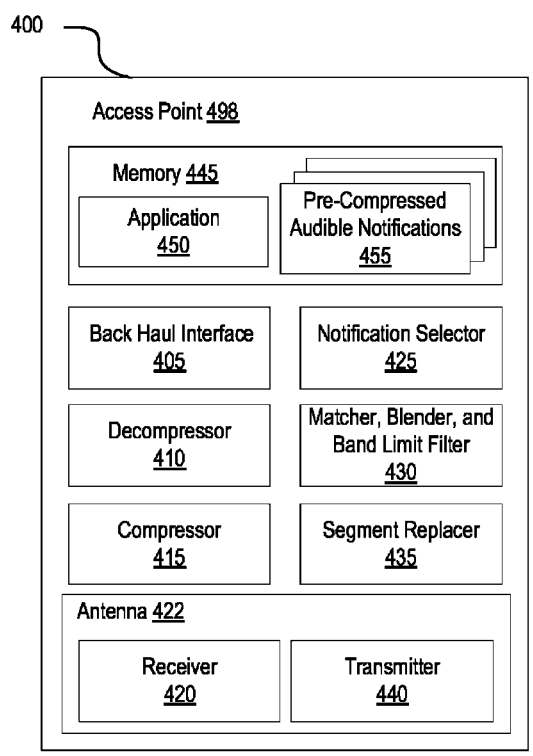
FIG. 4A is a diagrammatic representation of an access point for sending a notification to a mobile device indicating the mobile device has crossed a coverage area boundary associated with the access point, in accordance with one embodiment of the present invention.

FIG. 4A is a diagrammatic representation 400 of an access point 498 for sending a notification to a mobile device indicating the mobile device has crossed a coverage area boundary associated with the access point, in accordance with one embodiment of the present invention. Access point 498 is shown with many components, some of which are optional in some embodiments.

Memory 445 provides volatile and non-volatile storage capabilities within access point 498. Memory may include Random Access Memory (RAM) or equivalent operational memory, and may further include permanent storage, such as Read Only Memory (ROM), Non-Volatile Random Access Memory (NVRAM), Hard Disk Drive (HDD) storage, optical storage, and so forth. Memory 445 contains application 450 and multiple pre-compressed audible notifications 455. Application 450 may execute with the aid of a Central Processing Unit (CPU) and reside in volatile memory, while the pre-compressed audible notifications 455 may reside in permanent storage within memory 445 without the need for execution.

Application 445 may provide an Application Programming Interface (API) or a message interface with which to send and receive application messages and prompts to a corresponding application executing at a mobile device. APIs and message interfaces may include Short Message Service (SMS) message capabilities, remote application prompts, HTML based web traffic, and so forth.

Backhaul interface 405 provides a communication interface to a private internet connection and thus, a communications interface back to a service provider. Notification selector 425 may select one or more of the multiple pre-compressed audible notifications 455 based on events detected at the access point, a mapping provided by a service provider and stored at the access point, or based on an end-user configurable parameter or parameter set stored at the access point.

Decompressor 410 and compressor 415 provide decompression of compressed audio streams and compression of audio waveforms into compressed audio streams respectively. Increased computing (e.g., CPU) capabilities are required to perform large amounts of compression and decompression, while relatively small amounts of computing capabilities are required to perform small compression and decompression tasks, such as decompressing and recompressing slices, frame boundaries, or sub-portions of compressed audio stream segments.

Matcher, blender, and band limit filter 430 performs amplitude discontinuity reduction on decompressed waveforms, for example, by reducing the disparity in amplitude of a wave at two adjacent frame boundaries, by filtering out audible clicks and pops via screening for sharp drop offs or rises in amplitude, or by limiting a portion of a decompressed waveform (e.g., a portion corresponding to adjacent frame boundaries at a replaced segment of a compressed audio stream) to a narrow amplitude discontinuities within a frequency band or range.

Segment replacer 435 (e.g., a "segment replacing unit," a "segment substitution unit," or a "notification encoder") performs the replacement of original segments of a compressed audio stream with one or more replacement segments containing pre-compressed audible notifications 455 for transmission to a mobile device.

Radio subsystem 422 includes receiver 420 and transmitter 440. Radio subsystem 422 enables access point 498 to communicate with a mobile device wirelessly, over an air interface. Receiver 420 enables the reception of wireless signals from a mobile device, and transmitter 440 enables the transmission of wireless signals to a mobile device.

Figure 4B:
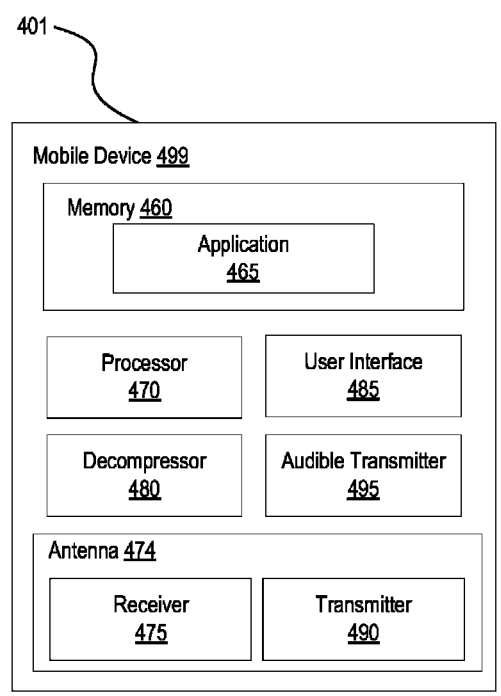
FIG. 4B is a diagrammatic representation of a mobile device for receiving a notification indicating the mobile device has crossed a coverage area boundary associated with an access point, in accordance with one embodiment of the present invention.

FIG. 4B is a diagrammatic representation 401 of a mobile device 499 for receiving a notification indicating the mobile device has crossed a coverage area boundary associated with an access point, in accordance with one embodiment of the present invention. Mobile device 499 is shown with many components, some of which are optional in some embodiments.

Memory 460 provides volatile and non-volatile storage capabilities within mobile device 499. Memory may include RAM or equivalent operational memory, and may further include permanent storage, such as ROM, NVRAM, HDD storage, optical storage, and so forth. Memory 460 contains application 465 which may provide an API and messaging interface to remote applications, such as application 450 executing at access point 498.

Processor 470 provides execution capabilities and memory access services for application 465. User interface 485 provides a graphical or textual based interface with which an end user may interact with mobile device 499 and application 465 executing thereon. User interface 485 may further display application prompts and messages generated locally or received remotely (e.g., from access point 498).

Decompressor 480 decompresses the compressed audio stream received from access points or from conventional cell towers, and sends the decompressed audio waveform extracted from the compressed audio stream to audible transmitter 495. Audible transmitter 495 audibly transmits the decompressed audio waveform, for example, via an integrated speaker, making the decompressed audio waveform perceptible to an end user.

Radio subsystem 474 includes receiver 470 and transmitter 490. Radio subsystem 474 enables mobile device 499 to communication with an access point wirelessly, over an air interface. Receiver 470 enables the reception of wireless signals from an access point, and transmitter 490 enables the transmission of wireless signals to an access point.

FIG. 5A is a flow diagram illustrating a method 500 for sending a notification to a mobile device indicating the mobile device has crossed a coverage area boundary associated with the access point, in accordance with one embodiment of the present invention.

Method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, method 500 is performed by a computing device, such as access point 135 of FIG. 1.

Referring to FIG. 5A, method 500 begins with processing logic in an access point communicably interfaced with a wireless telecommunications network, the access point receives a plurality of compressed audible notifications from a service provider and a notification mapping associating the compressed audible notifications with events (block 505).

At block 510, processing logic in the access point accepts a wireless communication session handoff request for a handoff of the mobile device between a network infrastructure cell tower and the access point.

At block 515, the access point determines that a mobile device has crossed a wireless coverage area boundary associated with the access point based on receiving the request for the wireless communication session handoff of the mobile device between the network infrastructure cell tower and the access point. For example, access point may determine that a mobile device has crossed a wireless coverage area boundary, entering into a coverage area associated with the access point by determining that the handoff request is for an incoming handoff, from an external conventional network infrastructure cell tower, coming to the access point. Similarly, the access point may determine that the mobile device has crossed the wireless coverage area boundary, exiting out of the coverage area associated with the access point by determining that the handoff request is for an outbound or outgoing handoff, from the access point itself, to an external conventional network infrastructure cell tower.

At block 520, processing logic in the access point selects for transmission to the mobile device, an audible notification from a plurality of audible notifications. Each audible notification is stored at the access point in compressed form prior to determining the mobile device has crossed the wireless coverage area boundary, and the audible notification is selected based on the notification mapping.

At block 525, the access point establishes a wireless communication session with the mobile device, and at block 530, receives a compressed audio stream from a service provider for transmission to the mobile device via the wireless communication session. At block 535, the access point encodes (e.g., embeds, injects, introduces) the compressed audible notification within the compressed audio stream for transmission to the mobile device via the wireless communication session by replacing a segment of the compressed audio stream from the service provider with the selected compressed audible notification.

At block 540, processing logic in the access point transmits the compressed audible notification to the mobile device within the compressed audio stream via the replaced segment of the compressed audio stream responsive to accepting the wireless communication session handoff.

At block 545, the access point adds taper data at one or more frame boundaries of one or more sequential data frames of the compressed audio stream to reduce amplitude discontinuity between the compressed audio stream and the compressed audible notification.

Figure 5B:
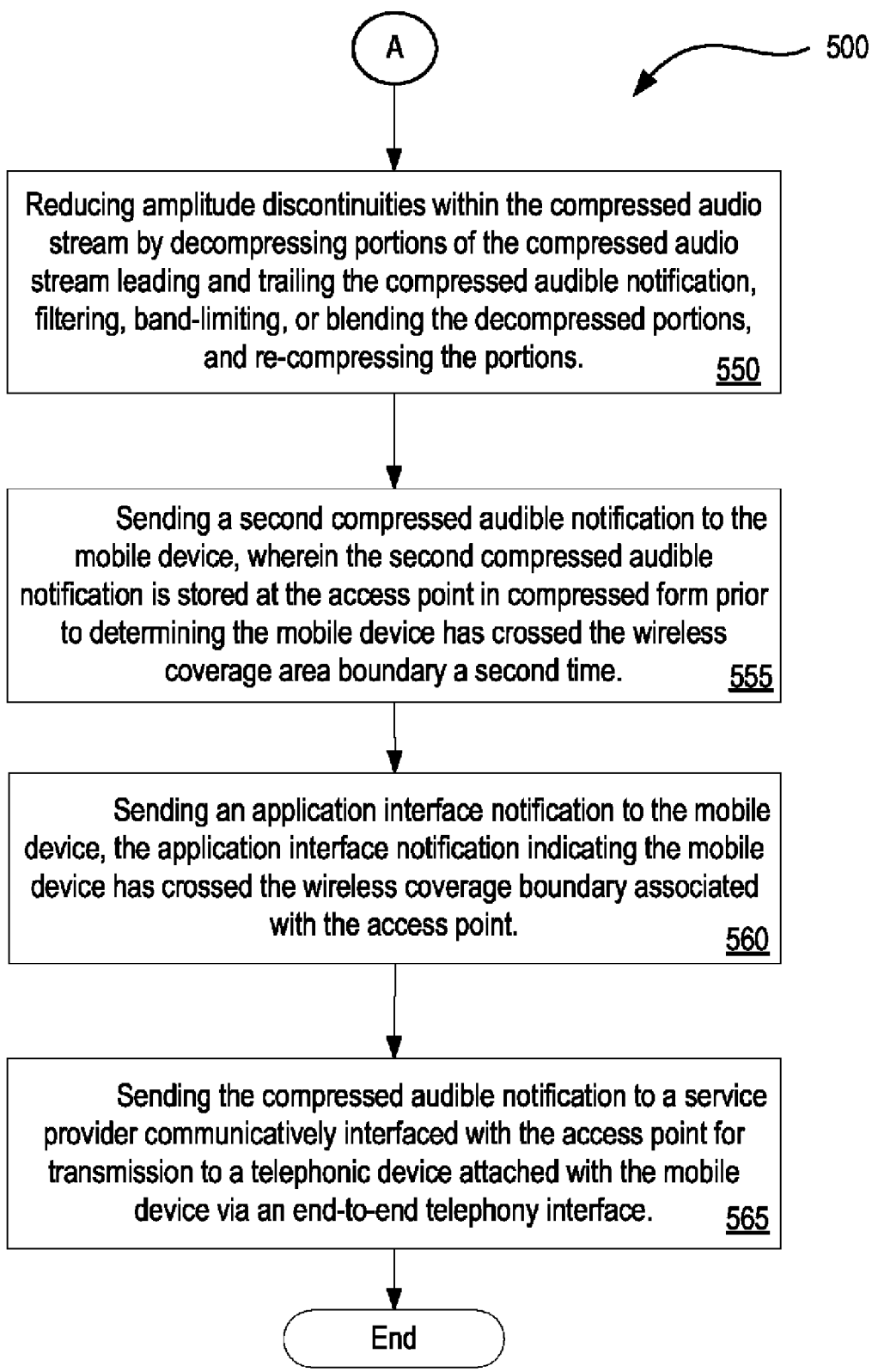
FIG. 5B is a continuation flow diagram illustrating the method from FIG. 5A.

FIG. 5B is a continuation flow diagram illustrating method 500 from FIG. 5A, beginning with block 550. Referring now to FIG. 5B, at block 550, processing logic in the access point reduces amplitude discontinuities within the compressed audio stream by decompressing portions of the compressed audio stream leading and trailing the compressed audible notification, filtering, band-limiting, or blending the decompressed portions, and re-compressing the portions.

At block 555, processing logic in the access point sends a second compressed audible notification to the mobile device, wherein the second compressed audible notification is stored at the access point in compressed form prior to determining the mobile device has crossed the wireless coverage area boundary a second time.

At block 560, processing logic in the access point sends an application interface notification to the mobile device, the application interface notification indicating the mobile device has crossed the wireless coverage boundary associated with the access point.

At block 565, processing logic in the access point sends the compressed audible notification to a service provider communicatively interfaced with the access point for transmission to a telephonic device attached with the mobile device via an end-to-end telephony interface (e.g., a second mobile device or a land-line handset connected via a telephone call).

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM), flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a backhaul interface 608 (e.g., a network interface device). The computer system 600 also may include a user interface 610 (e.g., a liquid crystal display (LCD) or a cathode ray tube (CRT)), an alphanumeric input device 612 (e.g., a keyboard), a cursor control device 614 (e.g., a mouse), and an integrated speaker 616 for transmitting audio streams and audible notifications (e.g., a signal generation device).

Main memory 604 may include, for example, notification selector 624 for selecting which of multiple notifications to encode into a compressed audio stream, and segment replacer 625 for encoding a selected notification into a compressed audio stream. Main memory 604 may further include, for example, matcher, blender, and filter 623 for use in reducing amplitude discontinuities potentially introduced into a compressed audio stream having replacement segment with an audible notification. The secondary memory 618 may include a machine-readable storage medium (or more specifically a computer-readable storage medium) 631 on which is stored one or more sets of instructions (e.g., software 622) embodying any one or more of the methodologies or functions described herein, or notifications 621 (e.g., pre-compressed audible notifications, application interface notifications, etc.). The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the backhaul interface 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having instructions stored thereon, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), read/write capable flash memory, magnetic disk storage media, optical storage media, etc.), a machine (e.g., computer) readable transmission medium (electrical, optical, acoustical), etc.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in an access point, comprising:
    determining that a mobile device has crossed a wireless coverage area boundary associated with the access point; and
    selecting for transmission to the mobile device, an audible notification indicating the mobile device has crossed the wireless coverage boundary associated with the access point, said audible notification is stored at the access point in compressed form, prior to determining the mobile device has crossed the wireless coverage area boundary, determining that the mobile device has crossed the wireless coverage area boundary associated with the access point by receiving a request for a wireless communication session handoff for the mobile device between a network cell tower and the access point;

accepting the wireless communication session handoff;

transmitting the compressed audible notification to the mobile device responsive to accepting the wireless communication session handoff by establishing a wireless communication session with the mobile device;

receiving a compressed audio stream from a service provider for transmission to the mobile device via the wireless communication session; and encoding the compressed audible notification within the compressed audio stream for transmission to the mobile device via the wireless communication session wherein encoding the compressed audible notification comprises selecting the compressed audible notification from the plurality of compressed audible notifications stored at the access point, replacing a segment of the compressed audio stream from the service provider with the selected compressed audible notification and transmitting the selected compressed audible notification to the wireless device within the compressed audio stream via the replaced segment of the compressed audio stream.

2. The method of claim 1, wherein the replaced segment of the compressed audio stream comprises one or more sequential data frames within a plurality of data frames of the compressed audio stream, the one or more sequential data frames comprising the compressed audible notification.

3. The method of claim 2, further comprising:
adding taper data at one or more frame boundaries of the one or more sequential data frames to reduce amplitude discontinuity between the compressed audio stream and the compressed audible notification.

4. The method of claim 2, further comprising:
adding lead-in taper data to a first frame boundary of the one or more sequential data frames of the compressed audio stream, the lead-in taper data to reduce a first amplitude discontinuity between a trailing portion of the compressed audio stream preceding a leading portion of the compressed audible notification; and
adding lead-out taper data to a second frame boundary of the one or more sequential data frames of the compressed audio stream, the lead-out taper data to reduce a second amplitude discontinuity between a leading portion of the compressed audio stream following a trailing portion of the compressed audible notification.

5. The method of claim 1, further comprising:
decompressing a trailing portion of the compressed audio stream preceding the compressed audible notification, a leading portion of the compressed audible notification, a trailing portion of the compressed audible notification, and a leading portion of the compressed audio stream following the compressed audible notification;
reducing amplitude discontinuities within the trailing portion of the compressed audio stream, the leading portion of the compressed audible notification, the trailing portion of the compressed audible notification, and the leading portion of the compressed audio stream, wherein reducing amplitude discontinuities comprises one or more of matching adjacent amplitude discontinuities, blending the adjacent amplitude discontinuities, and band limit filtering the adjacent amplitude discontinuities; and
re-compressing the decompressed portions of the compressed audio stream and the compressed audible notification after reducing the amplitude discontinuities.

6. The method of claim 1, wherein the compressed audio stream comprises a voice stream compressed in accordance with one of:
Adaptive Multi-Rate compression (AMR) on a Universal Mobile Telecommunications System (UMTS) operated by the service provider; or
Linear Predictive Coding (LPC) on a Global System for Mobile communications (GSM) system operated by the service provider.

7. The method of claim 1, wherein the compressed audible notification comprises one or more of:
an audible beep stored at the access point in compressed form;
an audible tone stored at the access point in compressed form;
an arbitrary waveform comprising recorded sound and stored in compressed form;
a pre-recorded audible voice message stored at the access point in compressed form; and
a synthesized audible voice message stored at the access point in compressed form.

8. The method of claim 1, wherein the access point comprises a femto cell base station.

9. The method of claim 1, wherein the compressed audible notification to further indicate to the mobile device, availability of one or more services within the coverage area provided by the access point.

10. The method of claim 9, wherein the one or more services comprise at least one of:
alternate billing rates for voice telephony communications;
alternate billing rates for data communications;
improved bit-rates for voice telephony communications;
improved transfer speeds for data communications;
local file sharing capabilities between the mobile device and other electronic devices communicatively interfaced with the access point;
location notification services indicating whether other mobile devices associated with the access point are communicatively interfaced with the access point;
e-commerce services enabling the mobile device to access media and services from the mobile device; and
local Private Branch eXchange (PBX) services between the mobile device and other telephony devices communicatively interfaced with the access point.

11. The method of claim 1, further comprising:
sending a second compressed audible notification to the mobile device indicating the mobile device has again crossed the wireless coverage area boundary associated with the access point, wherein the second compressed audible notification is stored at the access point in compressed form prior to determining the mobile device has crossed the wireless coverage area boundary a second time.

12. The method of claim 1, further comprising:
sending an application interface notification to the mobile device, the application interface notification indicating the mobile device has crossed the wireless coverage boundary associated with the access point, wherein the application interface notification comprises one of:
a Short Message Service (SMS) message originating at the access point;

a JAVA compatible application prompt directed at a JAVA virtual machine compatible servlet application executing at the mobile device; and a HyperText Transfer Protocol (HTTP) compatible data transfer instructing an Internet browser operating at the mobile device to display a web page originating at the access point.

13. The method of claim 1, further comprising:

receiving a plurality of compressed audible notifications from a service provider communicatively interfaced with the access point;

receiving a notification map from the service provider, wherein the notification mapping comprises a mapping of access point notification events to one or more of the plurality of compressed audible notifications, the access point notification events to trigger the access point to send one or more of the plurality of compressed audible notifications to the mobile device; and wherein selecting for transmission to the mobile device, the audible notification indicating the mobile device has crossed the wireless coverage boundary associated with the access point comprises, selecting the audible notification from the plurality of compressed audible notifications received from the service provider based on the notification map.

14. The method of claim 13, wherein selecting the audible notification from the plurality of compressed audible notifications based on the notification map further comprises selecting the audible notification based on one or more of the following:

a time of day in relation to a time based schedule;

a guest or member status of the mobile device in relation to the access point;

a current population of other mobile devices associated with the access point;

one or more environmental attributes accessible to the access point, the environmental attributes comprising internal temperature, external temperature, humidity, and local weather report data; and network condition information in relation to the access point, wherein network condition information comprises network link failure, low bandwidth status, network status report data, and excessive link delay status.

15. The method of claim 1, further comprising:

sending the compressed audible notification to a service provider communicatively interfaced with the access point for transmission to a telephonic device attached with the mobile device via an end-to-end telephony interface, the compressed audible notification indicating to the telephonic device that the mobile device has crossed the wireless coverage area boundary associated with the access point.

\* \* \* \* \*